R. J. MANDERFIELD.
COMBINED WEEDER AND CULTIVATOR.
APPLICATION FILED NOV. 1, 1912.
1,064,149.
Patented June 10, 1913.
4 SHEETS—SHEET 1.
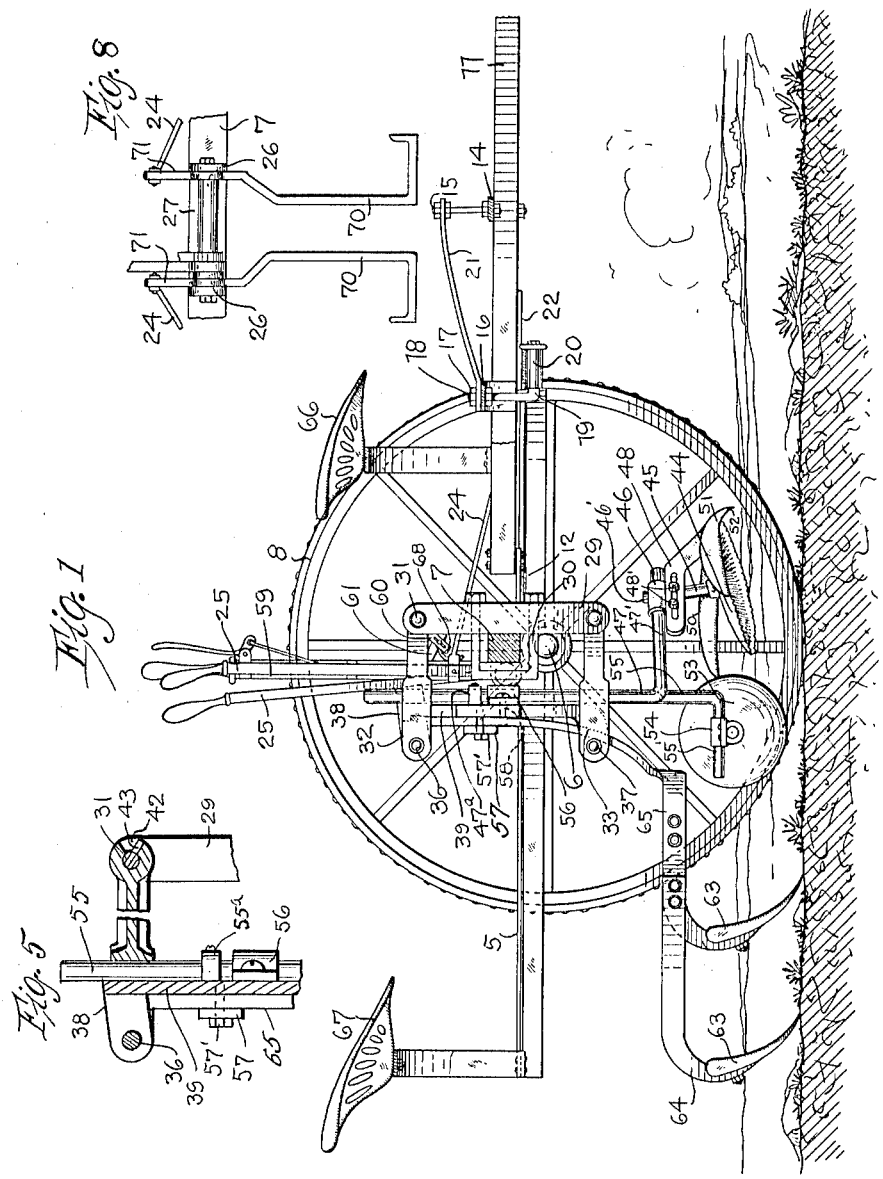
WITNESSES
Robert M. Sutphend
M. C. Syddall
INVENTOR
Robert J. Manderfield
By Watson E. Coleman his Attorney

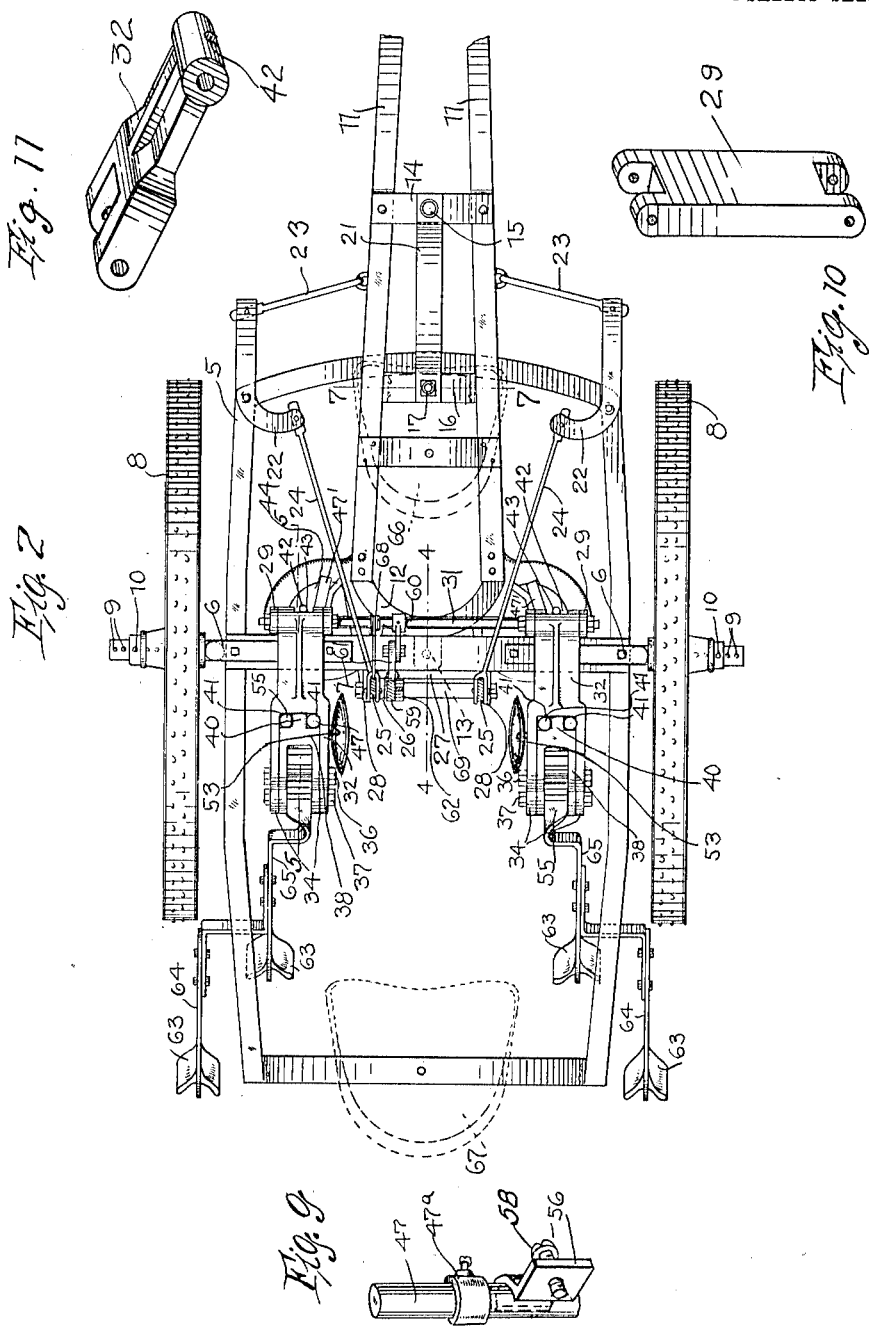

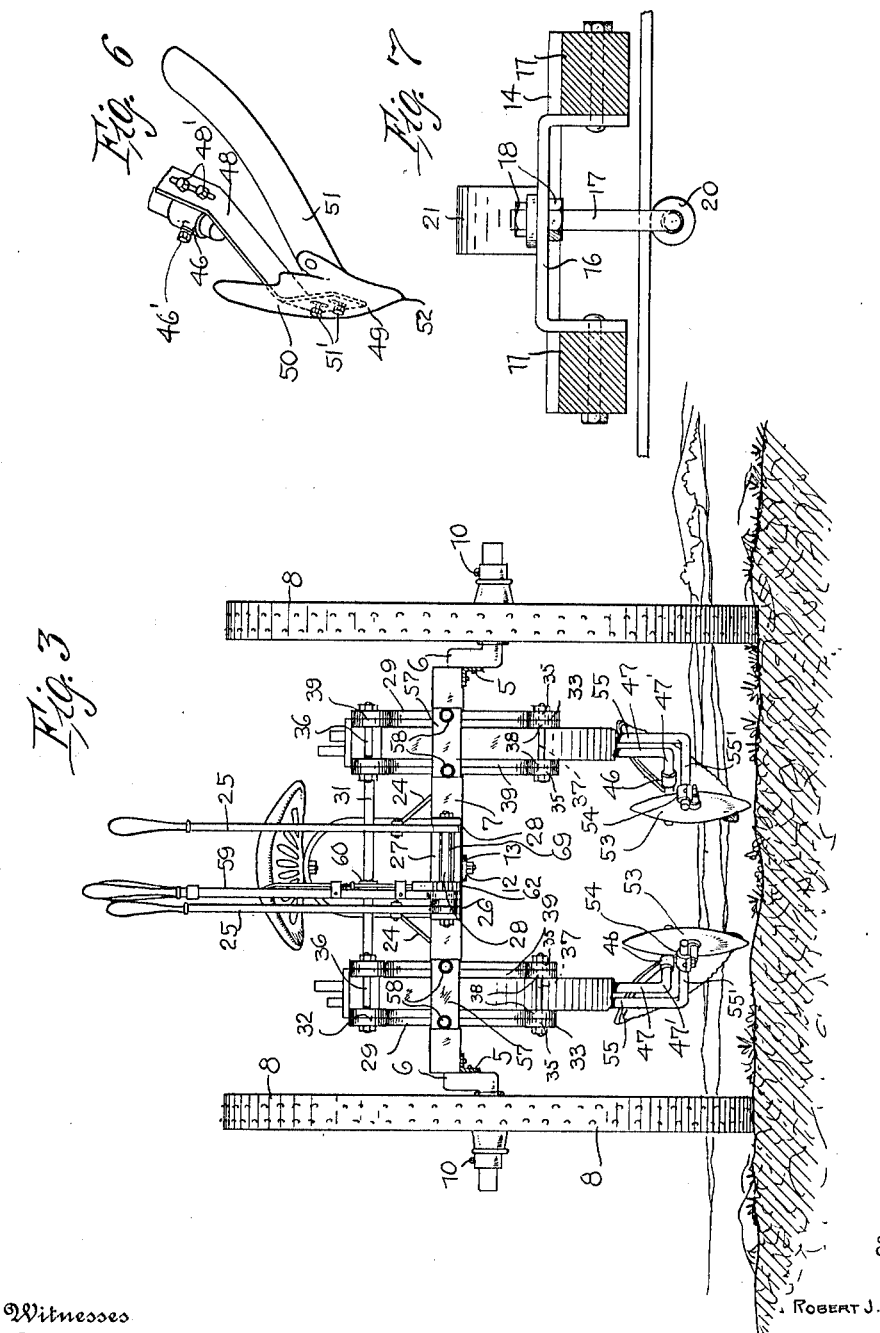
R. J. MANDERFIELD.
COMBINED WEEDER AND CULTIVATOR.
APPLICATION FILED NOV. 1, 1912.
1,064,149.
Patented June 10, 1913.
4 SHEETS—SHEET 3.

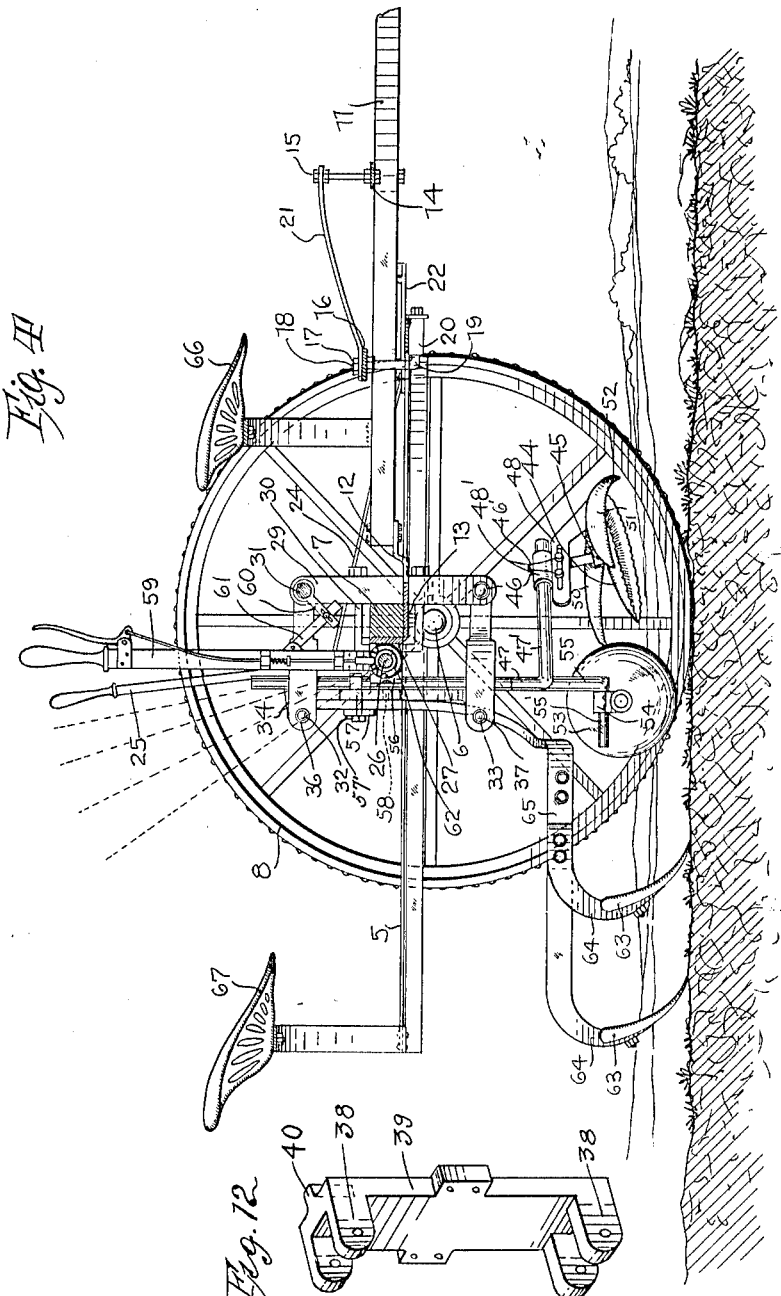

UNITED STATES PATENT OFFICE.

ROBERT J. MANDERFIELD, OF HOUGHTON, MICHIGAN.

COMBINED WEEDER AND CULTIVATOR.

1,064,149.  Specification of Letters Patent.  Patented June 10, 1913.

Application filed November 1, 1912. Serial No. 729,173.

*To all whom it may concern:*

Be it known that I, ROBERT J. MANDERFIELD, a citizen of the United States, residing at Houghton, in the county of Houghton and State of Michigan, have invented certain new and useful Improvements in Combined Weeders and Cultivators, of which the following is a specification, reference being had to the accompanying drawings.

This invention relates to a combination plant cultivator and weeding machine and has for its primary object to provide simple and novel means for mounting and adjusting the weed-destroying and plant cultivating elements.

Another object of the invention is to produce a machine of the above character wherein the operating elements are mounted and actuated in such a manner that they are at all times under the instant control of the operator, and improved means for steering the machine.

A still further object of the invention resides in the provision of an improved weed cutting and pulling disk and means for adjusting the same at a desired transverse inclination with relation to the plant row, and a novel form of guard or shield associated with said disk to eliminate all liability of the stalks or leaves of the plants being cut or torn.

Still another object of the invention resides in the provision of a plurality of weed tearing and cutting disks, and earth disturbing disks mounted to travel upon opposite sides of the plant row and cultivating shovels to break up the earth between the plant rows, and means to simultaneously raise or lower the disks and shovels upon either side of the plant row.

A further object of the invention is to produce a machine of the above character which is comparatively simple in construction, strong, durable and efficient in use and which may be manufactured at small cost.

With the above and other objects in view as will become apparent as the description proceeds, the invention consists in certain constructions, combinations, and arrangements of the parts that I shall hereinafter fully describe and claim.

For a full understanding of the invention reference is to be had to the following description and accompanying drawing, in which—

Figure 1 is a side elevation of a combined weed cutting and plant cultivating machine; Fig. 2 is a top plan view thereof; Fig. 3 is a rear end elevation; Fig. 4 is a section taken on the line 4—4 of Fig. 2; Fig. 5 is a detail vertical section taken on the line 5—5 of Fig. 2; Fig. 6 is a detail perspective view of one of the guard members for the weeding disks; Fig. 7 is a detail section taken on the line 7—7 of Fig. 2; Fig. 8 is a fragmentary rear elevation of the machine showing the foot levers connected thereto for the actuation of the steering device; Fig. 9 is a detail fragmentary perspective view of one of the disk carrying rods showing the stop collar thereon. Figs. 10, 11 and 12 are detail perspective views of certain of the parts.

Referring in detail to the drawings, 5 designates the main frame of the machine which is of elongated U-shaped form and is securely bolted to the stub axles 6. These axles are secured at their inner ends to the transverse axle bar 7. The usual supporting wheels 8 are revolubly mounted upon the axles 6 and are preferably adjustable longitudinally thereon so that the space between the wheels may be regulated in accordance with the width of the plant rows. For this purpose the outer ends of each of the axles is provided with a plurality of spaced openings 9 to receive key pins 10.

The spaced longitudinally extending draft bars 11 are connected at their rear ends by means of the U-shaped plate 12 which at its center is fulcrumed upon the under side of the axle bar 7 as indicated at 13. The draft bars 11 gradually converge at their forward ends and between the same the vehicle tongue is secured in any approved manner. A plate 14 connects and braces the bars 11 intermediate of their ends and in this plate the lower end of a vertical bolt 15 is fixed. An inverted U-shaped plate 16 is also transversely disposed between the bars 11 and is fixed at its ends thereto. A bolt 17 is secured at its upper end in a central opening provided in the plate 16 by means of the nuts 18. The lower end of this bolt is extended longitudinally and forwardly between the draft bars 5 as shown at 19 and has a roller 20 loosely mounted thereon. Upon this roller the intermediate transversely disposed portion of the U-shaped machine frame is supported. The upper ends of the bolts 15 and 17 are connected by means of the longitudinally disposed plate 21.

Upon the forward ends of the longitudinal portions of the main frame 5, the bell crank levers 22 are fulcrumed. A rod 23 connects the longitudinally disposed arm of each of these levers with the draft bars 11. To the other ends of the bell crank levers, the oppositely extending obliquely disposed rods 24 are connected, the rear ends of said latter rods being pivotally connected to the operating levers 25. These levers at their lower ends are loosely mounted upon a rod 26, which connects the rearwardly extending arms 28 formed upon a bar 27 which is longitudinally arranged upon the central portion of the axle bar 7 and is bolted or otherwise suitably fixed thereto. From this construction, it will be apparent that when the operator pulls either of the levers 25 rearwardly the draft bars 11 carrying the tongue to which the animals are attached will be swung transversely to one side or the other of the center of the machine. Thus the machine may be properly steered or directed by the operator to avoid injury to the plants in the operation thereof and to insure a thorough cutting of the weeds close to the plant row.

Upon the axle bar 7 and adjacent to each end thereof, a perpendicular forked standard 29 is adjustably secured by means of suitable clips indicated at 30, which embrace the axle bar and have their ends disposed through openings in the standards. It will be appreciated that by simply loosening the clips, the standards may be shifted longitudinally upon the axle bar. The purpose of this adjustment will become readily apparent as the description proceeds. In the upper ends of the spaced arms of the standards 29, the ends of a transverse rod or shaft 31 are journaled and upon said rod between the arms of the standards an oscillatory member 32 is loosely mounted. The standards 29 also extend below the vehicle axle and to said lower ends thereof the members 33, of similar form to the members 32, are pivotally connected. These members 32 and 33 extend rearwardly of the shaft 31, and are each bifurcated to provide spaced parallel arms 34 and 35 respectively. Transverse bolts 36 and 37 connect the arms of the members 32 and 33 and upon said bolts the laterally projected bifurcated heads 38 of the connecting bars 39 are loosely mounted. The upper heads 38 of the connecting bars 39 are provided with projections 40 which are adapted to engage the members 32 between the inner ends of the arms 34 thereof so as to limit the independent downward movement of the connecting bars 39. It will also be observed that by providing these projections or extensions, upon the upper ends of the bars 39, sockets 41 are produced between said projections and the arms of the members 32. The ends of the members 32 which are mounted upon the rod or shaft 31 are provided with arcuate notches or recesses 42 with the rear end walls of which the pins 43 arranged in openings in said shaft are adapted to engage, so that the simultaneous movement of the members 32 will be effected when the shaft 31 is rotated in the bearing standards. Normally, when the disks are in their operative positions, the pins 43 are disposed in the lower ends of the slots 42 so that the members 32 may rock upon the shaft 31 independently thereof, the rear ends of said members moving vertically when the disks encounter and pass over obstructions in the path of the machine, such independent movement of the members 32 being limited by the upper walls of the slots 42 engaging the pins 43 fixed in the shaft 31. When it is desired to lift the disks, the operator rotates the shaft 31 in the proper direction through the medium of the lever 59 to engage the pins 43 with the lower end walls of the slots 42, and thus swing the rear ends of the members 32 upwardly, thereby also elevating the parts connected to said members.

The weeding disks shown at 44 are provided with scalloped or notched edges and an arbor or journal stud 45 is centrally fixed to each of said disks. These journal studs are mounted in suitable bearings secured rigidly upon the longitudinally projecting ends 47' of the supporting rods 47. These bearings in which the journal studs are mounted to rotate may be of any approved construction. The bearing sleeves for the journal studs are preferably adjustably secured upon the longitudinal portions 47' of the rods 47 by means of set screws indicated at 46' whereby they may be rotated to dispose the weeding disks at any desired inclination.

Upon the bearings 46, the downwardly and inwardly inclined arms 48 are mounted, said arms being provided with slots through which the bolts 48' fixed in the bearings extend. These bolts are provided upon their upper ends with suitable clamping nuts whereby the bars 48 may be securely clamped in their adjusted positions. The lower ends of these bars are longitudinally and forwardly extended and upon the same the guards or shields generally indicated by the numeral 49 are mounted. These guards include the longitudinally disposed plates 50 and the curved plates 51, said latter plates extending in substantially concentric relation to the weeding disks 44 and contiguous to the peripheries thereof. The plates 50 carry spaced bolts 51' to be received in short vertical slots provided in the forwardly extending ends of the bars 48 whereby the guards may be vertically adjusted in accordance with the height of the plants. The bolts 51' are of course provided with suitable clamping nuts to secure the guards in their adjusted positions. At the juncture of the plates 50 and 51 of the guard members the outwardly and downwardly inclined points or directing spurs 52 are formed. These inclined projections engage upon opposite sides of the stalks of a plant row and operate to dispose the stalks compactly for movement between the rearwardly extending plates 50. It will be noted that the edges of the disks 44 at their point of nearest approach to the ground surface are disposed inwardly of the points or spurs 52. They will thus engage and cut away all weeds or other growths which may be present at the base of the plant stalks.

The cultivating disks 53 are of the ordinary form and are located rearwardly of the weeding disks 44. These cultivating disks are journaled in bearings 54 which are clamped in a similar manner to the bearings 46 of the weeding disks upon the lower longitudinal rearwardly projecting ends 55' of the perpendicular supporting rods or standards 55. The rods 47 and 55 carrying the weeding disks and cultivating disks, respectively, are adapted for arrangement between the ends of a plate 56 which is fixed to the intermediate portion of the bar 39 and the ends of said plate being connected to said bar 39 by the set screws 58, the upper ends of said rods or standards fitting into the sockets 41 as stated before. It will thus be seen that the disk-carrying rods may be independently adjusted vertically to dispose the disks in proper relation to the ground surface, and securely clamped in their adjusted positions. These rods are also provided with the adjustable stop collars 47ª and 55ª respectively, whereby downward movement of said rods when the clamping plate 56 is loosened for the rotary adjustment of said rods will be prevented. The disks themselves may be disposed in any desired angular relationship upon the lower horizontal ends of the supporting rods by simply turning and clamping the disk bearings thereon.

The cultivating and weeding disks upon both sides of the plant row are adapted to be simultaneously raised or lowered in order to avoid obstructions or for any other necessary purpose by means of a lever 59 which is fulcrumed at its lower end upon the rod 26 mounted in the ends of the plate 27. Upon the shaft 31 an arm 60 is secured at one of its ends and has its other end connected to the lever 59 by means of a link 61. The lever 59 carries the usual spring-pressed pawl for engagement with the teeth of a rack 62 mounted upon the axle bar 7. It will be readily understood that by simply shifting the lever 59 in the necessary direction, the shaft 31 will be rocked in its bearings and the cultivating and weeding disks raised or lowered.

In addition to the cultivating disks 53, which disturb the earth close to the plant rows, I provide the cultivating plows or shovels 63 which will thoroughly harrow the earth between the adjacent plant rows. These shovels are mounted upon the lower ends of the curved standards 64 which are rigidly fixed at their upper ends to each other. The shovels are arranged in pairs upon opposite sides of the machine and the standard 64 of each of the outer shovels is extended forwardly and provided with a series of openings whereby the same may be adjustably connected to the rear lower ends of the bars 65. These bars have their forward ends disposed between the arms of the lower bifurcated head 38 of the connecting members 39, and are disposed between the movable clamping plates 57 and said connecting members, said clamping plates being secured at their ends to the members 39 by screws 57'.

In order to obviate all liability of unintentional shifting movement of the draft bars 11 during the operation of the machine, I provide a short rod 68 which is loosely mounted at one of its ends upon the shaft 31 and is provided with a hook on its other end for engagement in the bifurcated rear end of one of the rods 24 at its point of connection to the lever 25. Between one of the levers 25 and the adjusting lever 59, a sleeve or thimble 69 is arranged upon the rod 26 to prevent relative longitudinal shifting movement of said levers upon the rod.

Upon the draft bars 11, a driver's seat 66 is mounted and upon the rear ends of the longitudinal portions of the main frame 5, an operator's seat 67 is arranged. In cases where the plants have attained a mature growth, and it is not necessary to exercise great care in the cutting of the weeds, the machine may be both driven and operated by one person. In such case, the levers 25 are dispensed with and the foot levers 70 are provided. These levers are mounted to rock upon the ends of the rod 26, and at their forward ends are angularly disposed as shown at 71 and provided with a series of openings for the connection thereto of the steering rods 24. The rear ends of the levers 70 are disposed in such proximity to the operator's seat 67 that they may be easily engaged and actuated by the foot of the driver.

From the foregoing, it is believed that the construction and manner of operation of my improved combination weeder and cultivator will be fully understood. As the spaced groups of weeding and cultivating disks have independent vertical movement, they will readily pass over low obstructions which may be encountered upon either side of the plant row, thus obviating liability of breakage of the parts, and also increasing the operating efficiency of the machine to a maximum degree. The machine is highly efficient and reliable in practical use and may be operated with the expenditure of a minimum amount of labor on the part of the operator. Owing to the simple construction of the various elements employed in the machine, it will be obvious that the same can be manufactured at comparatively small cost, and that it is also extremely strong and durable in use.

While I have shown and described the preferred construction and arrangement of the various elements, it will be understood that the invention is susceptible of considerable modification without departing from the essential features or sacrificing any of the advantages thereof.

Having thus described the invention, what is claimed is:

1. In a machine of the character described, a rock shaft, arms loosely mounted upon said rock shaft, weeding disks to travel upon opposite sides of a plant row, means for mounting the disks upon said arms, and means carried by the shaft to engage said arms when the shaft is rocked to elevate the disks and support the same in an inoperative position.

2. In a machine of the character described, a rock shaft, arms loosely mounted upon said rock shaft, hanger bars suspended from said arms, spaced weeding disks to travel upon opposite sides of a plant row, means for removably mounting said disks upon the hanger bars, said arms having limited oscillatory movement upon the rock shaft whereby the disks may move independently of each other in a vertical plane, and means carried by the shaft to engage said arms and elevate the disks when the shaft is rocked and support the same in an inoperative position.

3. In a machine of the character described, a rock shaft, bearings therefor, arms loosely mounted upon the rock shaft, and having limited oscillatory movement thereon, similar arms pivotally connected at one of their ends to the shaft bearings, members connecting the arms at opposite ends of the shafts, spaced weeding disks, means for detachably mounting said disks upon the connecting members, and means carried by the rock shaft to engage the arms thereon whereby the disks are elevated when the shaft is rocked and supported in an inoperative position.

4. In a machine of the character described, a rock shaft, arms loosely mounted upon said rock shaft and having limited oscillatory movement with respect thereto, cultivating disks, weeding disks and plows arranged in spaced groups for movement upon opposite sides of a plant row, means for removably securing each of said groups to one of the oscillatory arms whereby the same may move in a vertical plane with respect to the other group, and means carried by the rock shaft to simultaneously engage said arms and elevate the groups of implements.

5. In a machine of the character described, a rock shaft, bearings therefor, arms loosely mounted upon opposite ends of said shaft and having limited oscillatory movement with respect thereto, similar arms pivotally connected at one of their ends to the shaft bearings, members connecting the free ends of said arms, spaced groups of cultivating and weeding implements adapted to travel upon opposite sides of a plant row, means for detachably securing each group of implements to one of the connecting members between said arms whereby the groups of implements upon opposite sides of the row may move as a unit in vertical planes with respect to each other, and means carried by the rock shaft to simultaneously engage said arms and elevate the implement groups to support the same in an inoperative position.

6. In a machine of the character described, a rock shaft, arms loosely mounted upon opposite ends of the rock shaft and having limited oscillatory movement with respect thereto, spaced groups of cultivating and weed-destroying implements to travel upon opposite sides of a plant row, means for suspending the groups of implements from the respective arms whereby one group may move in a vertical plane with respect to the other, pins fixed in the rock shaft to engage the arms and elevate the implement groups, and means for actuating said rock shaft and holding the same against reverse movement to support the implement groups in their elevated position.

7. In a machine of the character described, spaced weeding disks to travel upon opposite sides of a plant row, vertical supporting rods having their lower ends longitudinally projected, means for adjustably mounting the disks upon the lower ends of said rods whereby their lateral inclination with relation to the plant row may be varied, and guard members mounted upon the disk bearings to protect the foliage of the plants from the cutting edges of the disks.

8. In a machine of the character described, spaced weeding disks to travel upon opposite sides of a plant row, said disks being laterally inclined from the plant row, and guard members mounted upon the disk bearings each including a rearwardly extending longitudinal arm and an arcuate arm arranged adjacent to the cutting edge of the disk.

9. In a machine of the character described, spaced weeding disks to travel upon opposite sides of a plant row, and a guard member associated with each of the disks, each of said guard members including a longitudinally and rearwardly extending arm and an arcuate arm arranged adjacent to the forward portion of the cutting edge of the disk.

10. In a machine of the character described, spaced weeding disks to travel upon opposite sides of a plant row, and a guard member associated with each of said disks, said guard members each having a forward downwardly and outwardly inclined portion, a longitudinal arm extending rearwardly therefrom and an arcuate arm arranged in juxtaposition to the forward portion of the cutting edge of the disk.

In testimony whereof I hereunto affix my signature in the presence of two witnesses.

ROBERT J. MANDERFIELD.

Witnesses:
LEONARD MEOLA,
C. A. SCHROARZ.

Copies of this patent may be obtained for five cents each, by addressing the "Commissioner of Patents, Washington, D. C."